United States Patent
Khayrallah et al.

(10) Patent No.: US 9,363,002 B2
(45) Date of Patent: Jun. 7, 2016

(54) PRECODING WITH PARTIALLY STALE FEEDBACK

(75) Inventors: Ali S. Khayrallah, Mountain View, CA (US); Yi-Pin Eric Wang, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1036 days.

(21) Appl. No.: 13/414,932

(22) Filed: Mar. 8, 2012

(65) Prior Publication Data

US 2013/0237212 A1    Sep. 12, 2013

(51) Int. Cl.
*H04B 7/06* (2006.01)
*H04L 25/03* (2006.01)
(Continued)

(52) U.S. Cl.
CPC .............. *H04B 7/0626* (2013.01); *H04B 7/022* (2013.01); *H04B 7/0452* (2013.01); *H04B 7/0663* (2013.01); *H04B 17/373* (2015.01); *H04L 1/0019* (2013.01); *H04L 25/03949* (2013.01); *H04B 7/0434* (2013.01); *H04L 25/03898* (2013.01)

(58) Field of Classification Search
CPC .... H04B 7/0456; H04B 7/024; H04B 7/0639; H04B 7/0417; H04B 7/0632; H04B 7/0626; H04B 7/0452; H04B 7/0634; H04B 7/0413; H04B 7/0478; H04B 7/0617; H04B 7/0465; H04B 7/0482; H04B 7/022; H04B 7/0619; H04B 7/066
USPC ........... 455/500, 524, 423, 452.1, 509, 452.2, 455/520, 66.1, 67.11, 67.7; 370/328, 329, 370/338
See application file for complete search history.

(56) References Cited

U.S. PATENT DOCUMENTS

2005/0014464 A1    1/2005 Larsson

FOREIGN PATENT DOCUMENTS

WO          2004107693 A1    12/2004
WO    WO 2009/090618 A2     7/2009

(Continued)

OTHER PUBLICATIONS

"On the Optimality of Multiantenna Broadcast Scheduling Using Zero-Forcing Beamforming", (IEEE Journal on selected areas in communications, vol. 24, No. 3, Mar. 2006).*
M. Maddah-Ali and D. Tse, Completely Stale Transmitter Channel State Information is Still Very Useful. Allerton Conference, 2010.

(Continued)

*Primary Examiner* — George Eng
*Assistant Examiner* — Jing Gao
(74) *Attorney, Agent, or Firm* — Patents on Demand, P.A.; Brian K. Buchheit; Scott M. Garrett (57) ABSTRACT

A system and method in which a base station treats the Channel State Information (CSI) from wireless terminals as only partially-stale, and exploits this partially-stale CSI to predict the current channel from old estimates of the channel. The predicted channel is then used to design a precoder. The base station shapes the transmitted signal with the precoder so as to match it as closely as possible to the current channel. Particular embodiments thus combine the benefits of the stale feedback scheme with precoding to match the channel. Consequently, the signal received at a terminal is better conditioned, thereby providing a greater overall boost in performance of the communication arrangement between the base station and the terminal. The usage of partially-stale CSI can be important for dense networks with a large number of simple terminals.

21 Claims, 3 Drawing Sheets (51) Int. Cl.
*H04L 1/00* (2006.01)
*H04B 7/04* (2006.01)
*H04B 7/02* (2006.01)
*H04B 17/373* (2015.01)

(56) References Cited

FOREIGN PATENT DOCUMENTS

| WO | WO 2009090618 A2 * | 7/2009 | | |
|----|--------|-------|----|----|
| WO | WO 2013048505 A1 * | 4/2013 | ............. | H04B 7/024 |

OTHER PUBLICATIONS

Heo, et al. A novel two-step channel-prediction technique for supporting adaptive transmission in OFDM/FDD system. IEEE Trans Veh. Technol., vol. 57, No. 1, pp. 188-193, Jan. 2008.

Tse, et al. Fundamentals of Wireless Communication Cambridge University Press, Cambridge. U.K. 2005.

Astely, et al. LTE: the evolution of mobile broadband. IEEE Comm. Mag., vol. 47, No. 4. pp. 44-51, Apr. 2009.

Taesang, et al. On the optimality of multiantenna broadcast scheduling using zero-forcing beamforming. IEEE J. on Select Areas in Commun., vol. 24, No. 3, pp. 528-541, Mar. 2006.

* cited by examiner

PRECODING WITH PARTIALLY STALE FEEDBACK

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

TECHNICAL FIELD

The present invention relates to exchange of information between terminals in a wireless network via a base station in the network, for the purpose of improving the communication between the base station and the terminals.

BACKGROUND

Terminals operating in a wireless network may exchange information via a base station in the network. The exchange may be in the form of channel feedback for the communication channel or link (e.g., a Radio Frequency (RF) channel) (conveniently referred to herein as the "channel") between the base station and the wireless terminals. The channel feedback may include, for example, one or more of (i) a Channel Quality Indicator (CQI) indicating channel quality of the wireless communication channel between the base station and a User Equipment (UE); (ii) a Precoding Matrix Indicator (PMI) indicating a preferred precoding matrix for shaping the transmit signal; and (iii) a Rank Indicator (RI) indicating the number of useful transmission layers for the data channel as preferred by the UE. The channel feedback may also include estimates of channel coefficients, referred to herein as Channel State Information (or CSI).

The channel feedback may enable the base station to adaptively configure a suitable transmission scheme to improve coverage or user data rate or to more accurately "predict" channel quality for future transmissions to the terminals. In case of a mobile communication environment of Third Generation (3G) and Fourth Generation (4G) cellular networks, such as Third Generation Partnership Project's (3GPP) Long Term Evolution (LTE) network, the Evolved Universal Terrestrial Radio Access (EUTRA) or Evolved Universal Terrestrial Radio Access Network (E-UTRAN) air interface for LTE may require a base station to allocate resource blocks to a UE or terminal where the resource blocks are generated by dividing the system bandwidth in the frequency domain. A base station may transmit wireless channel resource allocation information to a mobile handset, terminal or UE via a downlink control signal, such as the Physical Downlink Control Channel (PDCCH) signal in 3GPP's 3G and 4G networks. In modern cellular networks (e.g., LTE), after receiving this PDCCH downlink transmission (i.e., transmission from a base station to a mobile device), the UE may feed back the CSI via uplink signaling (i.e., transmission from a mobile device to the base station) to the base station such as the Physical Uplink Control Channel (PUCCH) or the Physical Uplink Shared Channel (PUSCH).

In "Completely Stale Transmitter Channel State Information is Still Very Useful," by M. Maddah-Ali and D. Tse, Allerton Conference, 2010 (referred to hereinafter as "Paper-1"), a multi-user downlink Multiple Input Multiple Output (MIMO) scheme is described with a mechanism for information exchange between single-antenna terminals, wherein the terminals feed back CSI to the serving base station. The base station exploits this CSI to broadcast an additional signal, which each terminal uses to create a Virtual 2-antenna Receiver (V2RX). The benefit of the V2RX may include a boost in performance for each terminal, which can translate into better coverage, higher bit rate, higher cell throughput (e.g., in case of a cellular wireless network), etc.

Figure 1:
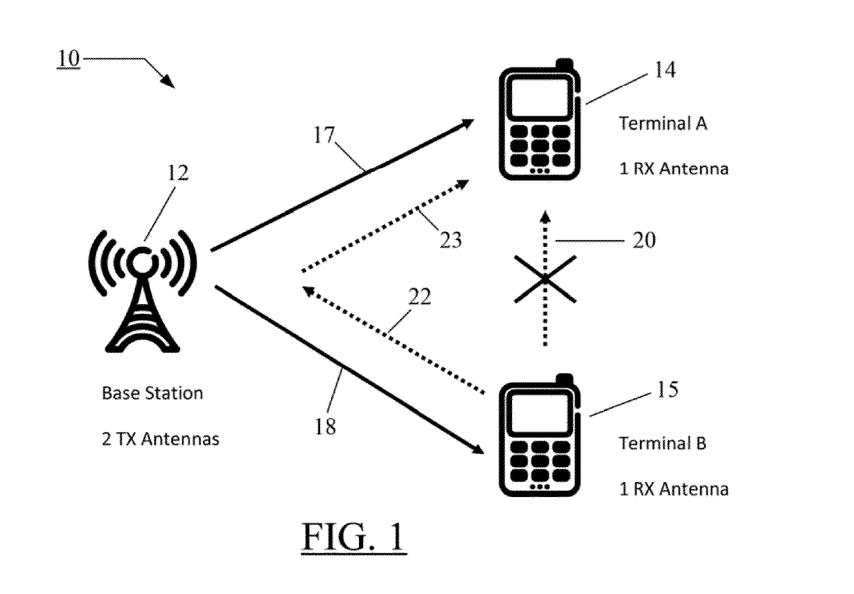
FIG. 1 illustrates an exemplary arrangement in which a base station facilitates information exchange between two terminals to form a Virtual 2-antenna Receiver (V2RX) at each terminal.

FIG. 1 illustrates an exemplary arrangement 10 in which a base station 12 facilitates information exchange between two terminals 14, 15 to form a V2RX at each terminal. The base station 12 may have two transmit/receive antennas (not shown)—herein referred to as "antenna-1" and "antenna-2," and may transmit information to two terminals (i.e., terminal A 14 and terminal B 15 in FIG. 1) operating in the wireless network served by the base station 12. The arrows 17 and 18 indicate such transmissions from the base station 12 to respective terminals 14-15. Each terminal 14-15 may have only a single receive antenna and can communicate back with the base station 12, but cannot communicate directly with the other terminal (as indicated by an "X" mark on the dotted arrow 20). However, as discussed below, the terminals 14-15 may be able to exchange information with each other via the base station 12 as indicated by exemplary dotted arrows 22-23, which show, by way of an example, terminal B sending information to terminal A via base station 12 in FIG. 1. Similarly, although not shown by any dotted arrows in FIG. 1, terminal A may send information to terminal B via base station 12.

At time 1, the base station 12 may transmit symbols $u_A$ (via antenna-1) and $v_A$ (via antenna-2) intended for terminal A, which receives:

$$y_A[1] = h_{A,1}[1]u_A + h_{A,2}[1]v_A + z_A[1] \quad (1)$$

where $h_{A,1}[1]$ and $h_{A,2}[1]$ are antenna-specific channel responses associated with terminal A (i.e., channel responses from base station antenna-1 and antenna-2, respectively, to terminal A), and $z_A[1]$ is the channel noise associated with terminal A. As used herein, the term "symbol" may refer to information content transmitted by a single antenna in a single transmission from the base station 12 to one or more terminals over the communication channel between the base station and the terminal(s). In case of an LTE network, for example, such transmission may include a radio sub-frame, or transmission time interval (TTI), having one or more slots (not shown). Terminal A 14 can try to recover $u_A$ and $v_A$ from $y_A[1]$. Being in the same communication environment, terminal B 15 is also "listening" to the transmission from the base station 12 to terminal A 14, and receives:

$$y_B[1] = h_{B,1}[1]u_A + h_{B,2}[1]v_A + z_B[1] \quad (2)$$

where $h_{B,1}[1]$, $h_{B,2}[1]$ and $z_B[1]$ relate to terminal B and are defined similarly to terminal A-related parameters mentioned above. If terminal A also had access to $y_B[1]$, it would use it along with $y_A[1]$ to form a 2-antenna receiver (V2RX), boosting its performance significantly. However, as mentioned earlier, terminal B cannot talk directly to terminal A. Thus, in the arrangement of FIG. 1, terminal B communicates indirectly with terminal A through the base station (as indicated by dotted arrows 22-23), allowing terminal A to form a Virtual 2-antenna Receiver (V2RX) as discussed below. Similarly, terminal A helps terminal B form its own virtual 2-antenna receiver. This process is explained below.

At time 2, the base station 12 may transmit symbols $u_B$ (via antenna-1) and $v_B$ (via antenna-2) intended for terminal B, which receives:

$$y_B[2]=h_{B,1}[2]u_B+h_{B,2}[2]v_B+z_B[2] \quad (3)$$

Here, terminal A 14 is also "listening" to base station's 12 transmission to terminal B 15, and receives:

$$y_A[2]=h_{A,1}[2]u_B+h_{A,2}[2]v_B+z_A[2] \quad (4)$$

where the channel responses (h[t]) and the noise terms (z[t]) are defined as above.

In the arrangement 10 in FIG. 1, before time 3, terminal B 15 feeds back estimates of antenna-specific parameters $h_{B,1}[1]$ and $h_{B,2}[1]$ to the base station 12. Similarly, before time 3, terminal A 14 also feeds back estimates of $h_{A,1}[2]$ and $h_{A,2}[2]$. The terminals A and B may provide these feedbacks via respective CSI reports to the base station 12. At time 3, the base station may form a new combined symbol $$w_{AB}=h_{A,1}[2]u_B+h_{A,2}[2]v_B+h_{B,1}[1]u_A+h_{B,2}[1]v_A \quad (5)$$

which it may transmit (to both terminals A and B) from antenna-1 only, for simplicity. It is noted here that $w_{AB}$ may contain very useful information for both terminals A and B, provided they are able to parse it out. Now focusing on terminal A, it is observed that terminal A receives:

$$y_A[3]=h_{A,1}[3]w_{AB}+z_A[3] \quad (6)$$

In response, terminal A can form a virtual second antenna signal using $y_A[3]$ (from equation (6) above) and $y_A[2]$ (from equation (4) above), suppressing the contributions of $u_B$ and $v_B$. This virtual second antenna signal can be given by:

$$y'_A[3] = y_A[3] - h_{A,1}[3]y_A[2] \quad (7)$$
$$= h_{A,1}[3]h_{B,1}[1]u_A + h_{A,1}[3]h_{B,2}[1]v_A + z_A[3] - h_{A,1}[3]z_A[2]$$

Together, $y_A[1]$ and $y'_A[3]$ form a V2RX for terminal A. Thus, in effect, terminal A "sees" a 2×2 MIMO unicast scenario, and can use any appropriate method to recover $u_A$ and $v_A$. In essence, with two observations $y_A[1]$ and $y'_A[3]$, terminal A has enough degrees of freedom to solve for the two unknown transmitted symbols $u_A$ and $v_A$. This can be done through, for example, maximum likelihood detection, which jointly hypothesizes the values of $u_A$ and $v_A$ to find the most likely combination given the observation of $y_A[1]$ and $y'_A[3]$. Another example is successive interference cancellation, in which symbol $u_A$ is detected first, treating the contribution from $v_A$ as interference. After detecting $u_A$, the interference contributed by $u_A$ is then cancelled from $y_A[1]$ and $y'_A[3]$. The cleaned-up signal is used to detect $v_A$. The detection order of $u_A$ and $v_A$ may be reversed.

Similarly, at time 3, terminal B receives:

$$y_B[3]=h_{B,1}[3]w_{AB}+z_B[3] \quad (8)$$

and combines it with $y_B[1]$ (from equation (2) above) to form a virtual second antenna for terminal B, suppressing the contributions of $u_A$ and $v_A$. As in case of terminal A, terminal B also "sees" a 2×2 MIMO unicast scenario and can recover $u_B$ and $v_B$ using an appropriate method as mentioned above.

Overall, the communication scheme in the arrangement of FIG. 1 requires 3 channel uses (at times t=1, 2, 3) to transmit 4 symbols ($u_A$, $v_A$, $u_B$, and $v_B$). In that sense, there is a gain, which is identified as a gain in degrees of freedom in Paper-1.

The above-discussed V2RX creation scenario generalizes readily to a base station with M>2 antennas and M single-antenna terminals. The scenario also generalizes readily to terminals with N>1 receive antennas.

SUMMARY

As discussed above, a base station may facilitate information exchange/feedback between two terminals to enable each terminal to form a V2RX. Via CSI reports to the base station, each terminal may indirectly supply to the other terminal information "received" from the base station when the supplying-terminal is not the primarily-intended recipient of the information transmitted from the base station. Such feedback of additional information enables the other terminal to more robustly receive transmissions from the base station.

However, in Paper-1, it is assumed that each CSI received by the base station from a terminal in the wireless network is stale, in the sense that the channel (between the base station and the terminals) may have changed completely by the time the base station transmits the extra signal (i.e., the combined symbol given by equation (5) above). Thus, in the above-discussed V2RX scheme of Paper-1, there is no attempt to exploit any time-correlation in the channel response. Thus, Paper-1 effectively assumes a totally stale CSI. However, the total staleness assumption may be too extreme in practice because the channel retains significant correlation over time. Modern wireless systems have very short time intervals—in the order of a millisecond—for each communication event (transmission/reception). Even accounting for the "turn-around time" (i.e., time to receive/process information and respond accordingly) of a terminal and the base station, there is still a significant correlation in the channel because of statistically negligible impact of any such time "delay" at a processing entity (a base station or a terminal). Thus, the CSI received at the base station is only partially stale, and the information contained in such partially-stale CSI may be wasted when the CSI is inaccurately assumed to be totally stale.

It is therefore desirable to devise a methodology that exploits the partially-stale CSI feedback received at a base station in a V2RX scheme or a similar scheme involving indirect communication between two wireless terminals via the base station.

Particular embodiments of the disclosed solutions may provide a solution to the above-mentioned inaccurate assumption of totally-stale CSI and resulting waste of important information contained therein. Particular embodiments treat the CSI from terminals as only partially stale, and exploits this partially-stale CSI to predict the current channel from old estimates of the channel. The predicted channel is used to design a precoder. The base station precodes the transmitted signal (i.e., shapes the transmitted signal with the precoder) so as to match it as closely as possible to the current channel. As a result, the signal received at a terminal is better conditioned, and the overall performance of the communication arrangement is further improved over the baseline totally-stale CSI scheme discussed in the "Background" section above with reference to Paper-1.

In one embodiment, a method is disclosed of providing wireless transmissions from a processor-controlled base station that is in wireless communication with a plurality of terminals via a communication channel established in a wireless network associated therewith. The base station includes a plurality of transmit antennas. The method comprises the steps of: using the processor, receiving respective terminal-specific Channel State Information (CSI) feedback from each of a first terminal and a second terminal in the plurality of terminals, wherein each terminal-specific CSI feedback corresponds to all antenna-specific transmissions from the base station to either of the first and the second terminals, wherein the antenna-specific transmissions temporally precede the terminal-specific CSI feedback; using the processor, determining a predicted communication channel based on a pre-determined number of time-wise correlated CSI feedbacks from the first and the second terminals, wherein the predicted communication channel represents a prediction of the communication channel; using the processor, shaping at least one terminal-specific transmission intended for the corresponding one or both of the first and the second terminals based on the predicted communication channel; and, using the processor, providing a common transmission intended for both of the first and the second terminals and related to a combination of information symbols in an earlier terminal-specific transmission to at least one of the first and the second terminals.

In another embodiment, a method is disclosed of providing wireless transmissions from a processor-controlled base station that is in wireless communication with M terminals via a communication channel established in a wireless network, wherein the base station includes M transmit antennas and each of the M terminals has at least one receive antenna, and wherein M>2. The method comprises the steps of: using the processor, receiving respective terminal-specific CSI feedback from each of the M terminals, wherein each terminal-specific CSI feedback corresponds to all antenna-specific transmissions from the base station to any of the M terminals, wherein the antenna-specific transmissions temporally precede the terminal-specific CSI feedback; using the processor, determining a channel estimate of the communication channel based on the respective CSI feedback received from each of the M terminals; using the processor, repeating the reception of the CSI feedback and determination of the channel estimate for a pre-determined number of temporally consecutive base station transmissions, thereby generating a pre-determined number of time-wise consecutive channel estimates; using the processor, determining a predicted communication channel based on the pre-determined number of time-wise consecutive channel estimates, wherein the predicted communication channel represents the prediction of the communication channel; using the processor, shaping at least one terminal-specific transmission intended for the corresponding one or more of the M terminals based on the predicted communication channel; and, using the processor, providing a common transmission intended for all of the M terminals and related to a combination of information symbols in an earlier terminal-specific transmission to at least one of the M terminals.

In a further embodiment, an improved method of forming a respective Virtual 2-antenna Receiver (V2RX) at a first terminal and a second terminal that are in wireless communication with a base station via a communication channel established in a wireless network is disclosed, wherein the base station has at least two transmit antennas. The improvement comprises: configuring each of the first and the second terminals to supply a respective CSI feedback that corresponds to all antenna-specific transmissions from the base station to either terminal, wherein the antenna-specific transmissions temporally precede the respective terminal-specific CSI feedback.

In another embodiment, a base station is disclosed that is in wireless communication with a first terminal and a second terminal via a communication channel in a wireless network. The base station has a plurality of transmit antennas. The base station is configured to perform the following: receive a respective terminal-specific CSI feedback from each of the first and the second terminals, wherein each terminal-specific CSI feedback corresponds to all antenna-specific transmissions from the base station to either of the first and the second terminals, wherein the antenna-specific transmissions temporally precede the terminal-specific CSI feedback; determine a predicted communication channel based on a pre-determined number of time-wise correlated CSI feedbacks from the first and the second terminals, wherein the predicted communication channel represents a prediction of the communication channel; shape at least one terminal-specific transmission intended for the corresponding one or both of the first and the second terminals based on the predicted communication channel; and provide a common transmission intended for both of the first and the second terminals and related to a combination of information symbols in an earlier terminal-specific transmission to at least one of the first and the second terminals.

In yet another embodiment, a first wireless terminal is disclosed, which is configured to perform the following: establish wireless communication with a base station via a communication channel in a wireless network, wherein the base station has a plurality of transmit antennas; and supply a plurality of CSI feedbacks to the base station so as to enable the base station to determine a precoder, wherein each CSI feedback corresponds to all antenna-specific transmissions from the base station to either the first wireless terminal or a second wireless terminal that is in wireless communication with the base station via the communication channel in the wireless network, and wherein the antenna-specific transmissions temporally precede the CSI feedback.

In a further embodiment, a system is disclosed that comprises a communication node, a first wireless terminal, and a second wireless terminal. The communication node is in wireless communication with a plurality of wireless terminals via a communication channel established in a wireless network, wherein the communication node has a plurality of transmit antennas and is configured to perform the following: (i) receive a respective CSI feedback from each of a first wireless terminal and a second wireless terminal in the plurality of wireless terminals, (ii) determine a channel estimate of the communication channel based on the respective CSI feedback received from each of the first and the second wireless terminals, (iii) repeat the reception of the CSI feedback and determination of the channel estimate for a pre-determined number of temporally consecutive transmissions from the communication node, thereby generating a pre-determined number of time-wise consecutive channel estimates, (iv) determine a predicted communication channel based on the pre-determined number of time-wise consecutive channel estimates, wherein the predicted communication channel represents a prediction of the communication channel, (v) shape at least one terminal-specific transmission intended for the corresponding one or both of the first and the second wireless terminals based on the predicted communication channel, and (vi) provide a common transmission intended for both of the first and the second terminals and related to a combination of information symbols in an earlier terminal-specific transmission to at least one of the first and the second terminals. The first and the second wireless terminals are configured to provide the respective terminal-specific CSI feedbacks to the communication node, wherein each terminal-specific CSI feedback corresponds to all antenna-specific transmissions from the communication node to either wireless terminal, wherein the antenna-specific transmissions temporally precede the terminal-specific CSI feedback.

The usage of partially-stale CSI according to particular embodiments the disclosed teachings can be an important enabler for dense networks with a large number of simple terminals. For example, such terminals may be sensors for various machine-to-machine applications (e.g., sensors (e.g., wireless picture or video cameras) on a train or a bus, sensors attached to home electrical meters to wirelessly report the meter reading, sensors placed on ground (e.g., for monitoring and wirelessly reporting seismic activity)), as opposed to full-fledged phones (e.g., cellular telephones or smartphones). Such terminals are likely to be small and cheap, with a single antenna (for transmission as well as reception), a noisy front end, limited processing capability, and slow feedback. This makes the boost in the terminal's performance afforded by the disclosed solutions particularly useful.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, the present invention may be practiced without these specific details. In other instances, well-known methods, procedures, components and circuits have not been described in detail so as not to obscure the present invention. Additionally, it should be understood that although the disclosed solutions is described primarily in the context of a dense wireless network with a large number of simple terminals, the disclosed solutions can be implemented in other forms of wireless networks as well (for example, a corporate-wide wireless data network, a satellite communication network, a cellular telephone/data network, and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "pre-determined," "antenna-1", etc.) may be occasionally interchangeably used with its non-hyphenated version (e.g., "predetermined," "antenna 1," etc.), and a capitalized entry (e.g., "Terminal") may be interchangeably used with its non-capitalized version (e.g., "terminal"). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing voice information or non-voice data/control information) to the second entity regardless of the type (analog or digital) of those signals. It is further noted that various figures (including network diagrams or component diagrams) shown and discussed herein are for illustrative purpose only, and are not drawn to scale.

Figure 2:
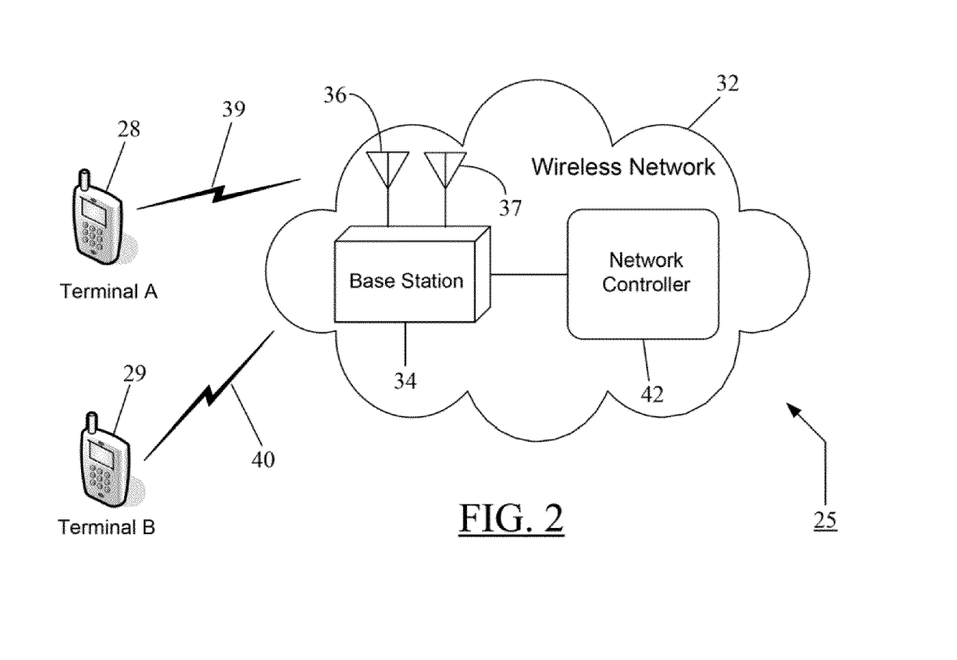
FIG. 2 is a diagram of an exemplary wireless system in which partially-stale CSI usage methodology according to the teachings of one embodiment of the present invention may be implemented.

FIG. 2 is a diagram of an exemplary wireless system 25 in which partially-stale CSI usage methodology according to the teachings of one embodiment of the present invention may be implemented. The system 25 may include two wireless terminals—terminal A 28 and terminal B 29—that are in wireless communication with a wireless network 32 through a base station (also interchangeably referred to herein as a "communication node" or "node") 34 of the network 32. The network 32 may be operated, managed, owned by a wireless service provider (or operator). The base station 34 may be, for example, a base station in a 3G network, or an evolved Node-B (eNodeB or eNB) or Home eNodeB (HeNB) when the carrier network is a Long-Term Evolution (LTE) network, or any other home base station or femtocell, and may provide radio interface (e.g., an RF channel) to the wireless terminals 28-29. In other embodiments, the base station 34 may also include a site controller, an access point (AP), or any other type of radio interface device capable of operating in a wireless environment. It is noted here that the terms "mobile handset," "wireless handset," "terminal," "wireless terminal," and "User Equipment (UE)" may be used interchangeably herein to refer to a wireless communication device that is capable of voice and/or data communication via a carrier network. Similarly, the terms "wireless network" or "carrier network" may be used interchangeably herein to refer to a wireless communication network (e.g., a cellular network, a proprietary data communication network, a corporate-wide wireless network, etc.) facilitating voice and/or data communication with two user equipments (UEs). Like terminals 14-15, in the embodiment of FIG. 2, each terminal 28-29 may be a terminal with a single antenna (performing both transmission and reception) and can communicate back with the base station 34, but cannot communicate directly with the other terminal. Thus, terminals 28-29 may exchange information with each other via the base station 34 in the same manner as that discussed with reference to terminals 14-15 in FIG. 1. In another embodiment, each terminal 28-29 may have N>1 receive antennas. In the exemplary embodiment of FIG. 2, the base station 34 is shown to include two antennas—antenna-1 identified by reference numeral "36" and antenna-2 identified by reference numeral "37", each of which could perform transmission and reception. In other embodiments, the wireless network 32 may be a dense network with a large number of wireless terminals (e.g., M>2 single-antenna terminals), in which case the base station 34 may have M>2 antennas. For ease of discussion, only two single-antenna terminals 28-29 served by one two-antenna base station 34 are shown in FIG. 2. It is observed here that the terminals 28-29 may be stationary or mobile.

As mentioned before, in one embodiment, the terminals 28-29 may be simple terminals with limited processing capability. For example, the terminals 28-29 may be sensors for various machine-to-machine applications (e.g., sensors (e.g., wireless picture or video cameras) on a train or a bus sending data to a base station that also may be on the train or bus, sensors attached to home electrical meters to wirelessly report the meter reading to a mobile base station (e.g., on a utility truck), sensors placed on ground (e.g., for monitoring and wirelessly reporting seismic activity) and communicating with a stationary or mobile (e.g., on an airplane) base station), as opposed to full-fledged phones (e.g., cellular telephones or smartphones). Such terminals may be small and cheap, with a single antenna (for transmission as well as reception). However, the disclosed solutions (related to indirect communication between two wireless terminals via a base station) may also be used in conjunction with other more-sophisticated mobile handsets such as, for example, modern cellular telephones or data transfer equipments (e.g., a Personal Digital Assistant (PDA) or a pager), smartphones (e.g., iPhone™, Android™, Blackberry™, etc.), computers, or any other type of user devices capable of operating in a wireless environment.

In addition to providing air interface or wireless channel (e.g., as represented by wireless links 36-37 in FIG. 2) to the terminals 28-29 via antennas 36-37, the communication node (or base station) 34 may also perform radio resource management (as, for example, in case of an eNodeB or HeNB in an LTE system) using, for example, the channel feedback reports received from the terminals 28-29 operating in the network 32. It is noted here that the term "channel," as used herein, may refer to a single, physical over-the-air interface between the base station 34 and terminals 28-29. However, between any two points (e.g., a transmit antenna and a receive antenna), there may be a specific effective channel response, summarizing all the signal losses, signals bouncing off of obstacles, etc. This effective channel response between any such two points may be represented by a "channel coefficient." Thus, as discussed in more detail below with reference to equation (9), two transmit antennas (on the base station 34) and two receive antennas (one on each terminal 28, 29) may be represented by four channel coefficients.

In case of a 3G carrier network 32, the communication node 34 may include functionalities of a 3G base station along with some or all functionalities of a 3G Radio Network Controller (RNC) to process partially-stale CSI as discussed in more detail below. Communication nodes in other types of carrier networks (e.g., 4G networks and beyond) also may be configured similarly. In one embodiment, the base station 34 may be configured (in hardware, via software, or both) to implement the partially-stale CSI usage methodology as discussed herein. For example, when existing hardware architecture of the base station 34 cannot be modified, the partially-stale CSI usage methodology according to one embodiment of the present invention may be implemented through suitable programming of one or more processors (e.g., processor 74 (or, more particularly, processing unit 80) in FIG. 6) in the communication node 34. The execution of the program code (by a processor in the node 34) may cause the processor to use partially-stale CSI to determine a precoder and apply the precoder to transmitted signals as discussed herein. Thus, in the discussion below, although the base station 34 may be referred to as "performing," "accomplishing," or "carrying out" a function or process, it is evident to one skilled in the art that such performance may be technically accomplished in hardware and/or software as desired. Similarly, the terminals 28-29 may be suitably configured (in hardware and/or software) to receive the transmissions from the base station 34, recover the transmitted symbols, and provide CSI reports to the base station 34.

The carrier network 32 may include a network controller 42 coupled to the base station 34 and providing logical and control functions (e.g., terminal mobility management, access to external networks or communication entities, etc.) in the network 32. In case of an LTE carrier network, the network controller 42 may be a core network including an Access Gateway (AGW). Regardless of the type of carrier network 32, the network controller 42 may function to provide connection of the base station 34 to other terminals (not shown) operating in the carrier network 32 and also to other communication devices (e.g., wireline or wireless phones, computers, monitoring units, etc.) or resources (e.g., an Internet website) in other voice and/or data networks (not shown) external to the carrier network 32. In that regard, the network controller 42 may be coupled to a packet-switched network (e.g., an Internet Protocol (IP) network such as the Internet) (not shown) as well as a circuit-switched network (not shown) such as the Public-Switched Telephone Network (PSTN) to accomplish the desired connections beyond the carrier network 32.

The carrier network 32 may be a cellular telephone network or a non-cellular wireless network (whether voice network, data network, or both). Furthermore, portions of the carrier network 32 may include, independently or in combination, any of the present or future wireline or wireless communication networks such as, for example, the PSTN, or a satellite-based communication link. Similarly, as also mentioned above, the carrier network 32 may be connected to the Internet via its network controller's 42 connection to an IP (packet-switched) network (not shown) or may include a portion of the Internet as part thereof.

Figure 3:
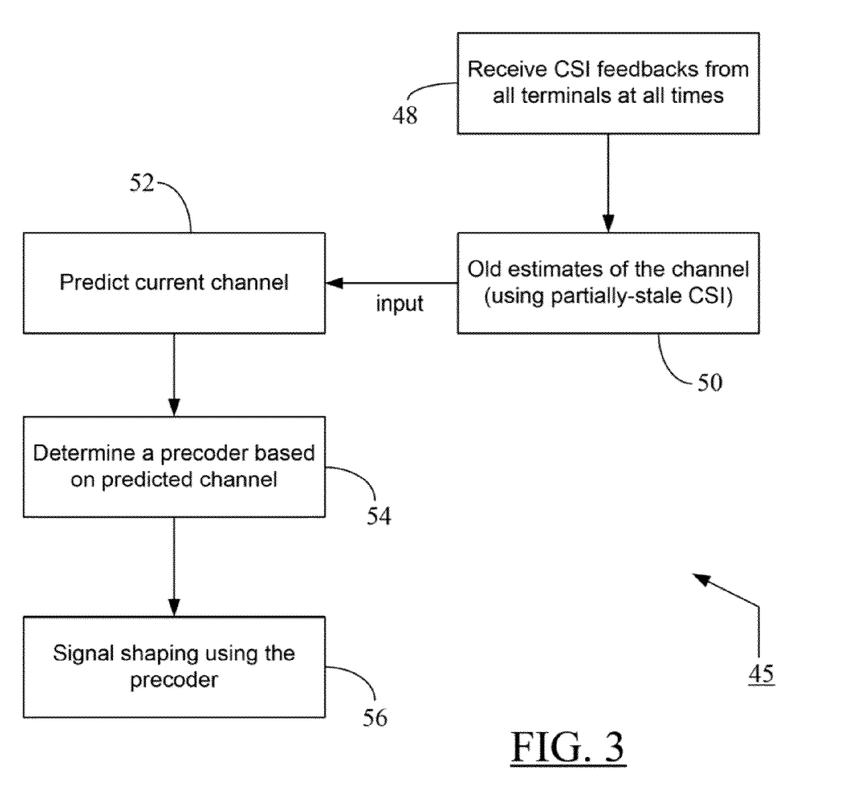
FIG. 3 depicts an exemplary flowchart according to one embodiment of the present invention to perform precoding with a partially-stale CSI feedback.

FIG. 3 depicts an exemplary flowchart 45 according to one embodiment of the present invention to perform precoding with a partially-stale CSI feedback. The flowchart 45 is discussed briefly here, and various blocks in the flowchart 45 are discussed in more detail below. As shown at block 48 in FIG. 3, the base station 34 may receive CSI feedbacks from all terminals (i.e., both of the terminals 28 and 29 in FIG. 2) at all times. Each terminal-specific CSI feedback may correspond to all those antenna-specific transmissions from the base station 34 that time-wise precede the terminal-specific feedback. For example, the CSI feedback from terminal A 28 related to time 1 may correspond to all antenna-specific transmissions from base station's antennas 1 and 2 (i.e., antennas 36, 37 in FIG. 2) at time 1, and so on. At block 50, the base station 34 may determine estimate of the channel based on the respective CSI feedbacks from the terminals 28-29, and because the communication channel between the base station 34 and the terminals 28-29 may retain significant correlation over time, the base station may generate a pre-determined number of old estimates of the channel based on partially-stale CSI (corresponding to a pre-determined number of time-wise consecutive transmissions from the base station 34). These "old" or earlier estimates of the channel also may be time-wise consecutive (e.g., estimates at t−1, t−2, t−3, etc.). In one embodiment, "t" may be used to index a TTI. At block 52, the base station 34 may predict current channel (at time=t) using the old estimates of the channel (from block 50). At block 54, the base station 34 may determine a precoder (for transmissions at time=t) based on the predicted channel at block 52. Thereafter, at block 56, the base station 34 may perform signal-shaping using the precoder by applying the precoder to at least one terminal-specific transmission (e.g., transmission intended specifically for terminal A, or for terminal B, or for both).

A detailed discussion of the methodology depicted in the flowchart 45 in FIG. 3 is now provided. For the sake of compactness, the familiar matrix notation is used in the discussion below. At time t, the wireless communication channel (between the base station 34 and terminals 28-29) may be written as a matrix of antenna-specific channel responses (i.e., channel responses from antennas 1 and 2 identified by reference numerals "36" and "37" in FIG. 2) associated with corresponding terminals A and B. The matrix is given as:

$$H[t] = \begin{bmatrix} h_{A,1}[t] & h_{A,2}[t] \\ h_{B,1}[t] & h_{B,2}[t] \end{bmatrix} \quad (9)$$

It is noted here that in the baseline scheme in Paper-1, only the "listening" terminal needed to feed back CSI. For instance, at time 1, Terminal B fed back estimates of $h_{B,1}[1]$ and $h_{B,2}[1]$ (via terminal-specific CSI from terminal B), whereas Terminal A did not feed back estimates of $h_{A,1}[1]$ and $h_{A,2}[1]$. In contrast, in one embodiment of the present invention, it is assumed that both terminals A and B (i.e., terminals 28-29 in FIG. 2) feed back corresponding CSI to the base station 34 at all times (as indicated at block 48 in FIG. 3). Thus, in one embodiment of the present invention, for each time t, after some delay D, the base station 34 has an estimate of the whole matrix H[t] (in equation (9) above), and the estimate is denoted as $\hat{H}[t]$ (which represents estimated channel determined by the base station 34 using CSI's received from terminals 28-29). It is noted here that the antenna-specific parameters h[ . . . ] in equation (9) do not represent any precoding. The precoder-based version of the matrix in equation (9) is discussed below with reference to equations (12) and (19).

The base station 34 may predict the channel matrix at time t (blocks 50 and 52 in FIG. 3), denoted $\tilde{H}[t]$ (which may be referred to as "predicted channel"), based on a pre-determined number of time-wise consecutive "old" channel estimates $\hat{H}[t-D]$, $\hat{H}[t-D-1]$, . . . , $\hat{H}[t-D-n+1]$, where "D" represents the time delay in receiving a CSI feedback from a terminal in response to a time-wise preceding corresponding transmission from the base station and "n" is a pre-determined number of old estimates, that may be selected as per desired implementation. For example, "n" may be chosen according to the rate of change of the channel, which is affected by the speed of the terminal. As is understood, the time-wise consecutive earlier channel estimates $\hat{H}[ \ldots ]$ may correspond to similarly temporally consecutive transmissions from the base station 34. Hence, it is seen that the base station 34 may exploit time-wise correlation among CSI feedbacks from the terminals (as represented by temporally-related channel estimates $\hat{H}[ \ldots ]$) to determine the predicted channel $\tilde{H}[t]$. The mismatch between the true and predicted channels can be modeled as:

$$H[t] = \tilde{H}[t] + \Delta \quad (10)$$

where Δ is the prediction error. It is seen from equation (10) that a shorter delay (i.e., delay "D" in communication between base station and terminals A, B) leads to a better prediction and a smaller prediction error Δ.

There are many well-known methods for predicting $\tilde{H}[t]$, with different models and tradeoffs of complexity and performance. For instance, the base station 34 may use a moving average of n estimates as given below:

$$\tilde{H}[t] = \sum_{k=0}^{n-1} \alpha_k \hat{H}[t - D - k] \quad (11)$$

where the coefficients $\alpha_k$ may be fixed, or adapted to reflect the correlation of the channel over time. A popular approach in determining the prediction filter coefficients $\alpha_k$ is based on Wiener filtering discussed in J. Heo, Y. Wang, and K. Chang, "A novel two-step channel prediction technique for supporting adaptive transmission in OFDM/FDD system," IEEE Trans. Veh. Technol., Vol. 57, No. 1, pp. 188-193, January 2008, which discussion is incorporated herein by reference.

Given the predicted channel $\tilde{H}[t]$, the base station 34 may then determine (e.g., through design or selection as discussed hereinbelow) a precoder, denoted as P[t], to shape the transmitted signal at time t. The precoder determination is indicated at block 54 in FIG. 3. The cascade of the precoder and the true channel creates an effective channel experienced by the transmitted signal (before the precoder) and given by the product $$H_{eff}[t] = H[t]P[t] \quad (12)$$

Figure 4:
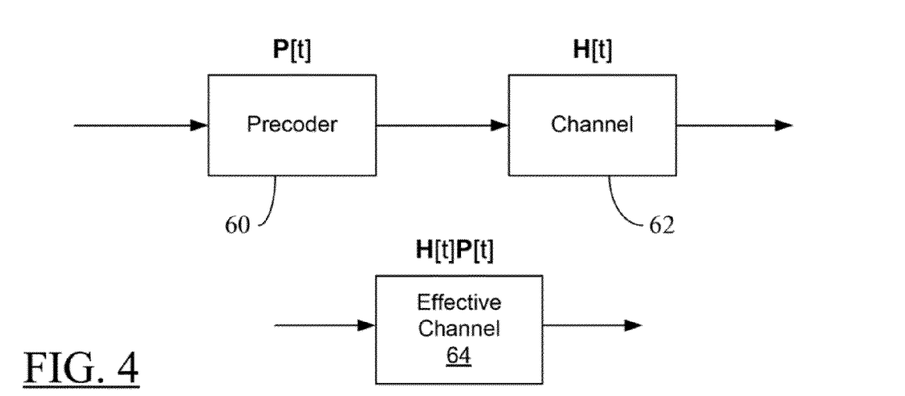
FIG. 4 is a simplified illustration of a cascade of a precoder and current channel along with the equivalent effective channel according to one embodiment of the present invention.

FIG. 4 is a simplified illustration of a cascade of a precoder 60 and current channel 62 along with the equivalent effective channel 64 according to one embodiment of the present invention. The signal to-be-transmitted may be input to the precoder 60 and then transmitted to the terminal(s) over the channel 62 (as indicated at block 56 in FIG. 3). Thus, as shown in FIG. 4, the signal may experience the effective channel 64.

There are many well-known methods for precoder design, with different tradeoffs of complexity and performance. (More details on precoding, also known as transmit beamforming, may be obtained from D. Tse and P. Viswanath, "Fundamentals of Wireless Communication," Cambridge University Press, Cambridge, U.K. 2005; and D. Astely, E. Dahlman, A. Furuskar, Y. Jading, M. Lindstrom, and S. Parkvall, "LTE: the evolution of mobile broadband," IEEE Comm. Mag., Vol. 47, No. 4, pp. 44-51, April 2009.) For example, in one embodiment, the base station 34 may use a zero-forcing precoder as discussed in Y. Taesang and A. Goldsmith, "On the optimality of multiantenna broadcast scheduling using zero-forcing beamforming," IEEE J. on Select Areas in Commun., Vol. 24, No. 3, pp. 528-541, March 2006, the discussion of which related to zero-forcing precoder is incorporated herein by reference. In that embodiment, the precoder may be given by:

$$P[t] = \tilde{H}^{-1}[t] \quad (13)$$

if the inverse exists. Alternatively, in another embodiment, the base station may use an eigen-beamformer as discussed in the earlier-mentioned reference of D. Tse and P. Viswanath, "Fundamentals of Wireless Communication," Cambridge University Press, Cambridge, U.K. 2005, the discussion of which related to eigen-beamforming is incorporated herein by reference. In this embodiment, the precoder may be given by:

$$P[t] = U \quad (14)$$

where U is a unitary matrix that satisfies the following:

$$\tilde{H}^h[t]\tilde{H}[t]=U\Lambda^2 U^h \quad (15)$$

In equation (15), Λ is a diagonal matrix, $U^h$ represents the Hermitian (conjugate transpose) of U, and $\tilde{H}^h[t]$ represents the Hermitian of $\tilde{H}[t]$. With eigen-beamforming, the effective channel (in equation (12)) becomes HU. The receiver (e.g., the terminals 28-29) may estimate the effective channel (in equation (12)) and apply match-filtering to the effective channel, giving rise to a net channel matrix $$H_{net}=(HU)^h HU \quad (16)$$

Thus, the net channel matrix may represent the effective channel as estimated at the receiver. Channel estimation at the receiver may be facilitated by including known reference symbols in a subframe (or TTI). These reference symbols are processed by precoder P[t]=U and then transmitted through the radio channel H. Thus, by observing the received values corresponding to these known reference symbols, the receiver can form an estimate of HU. In any event, regardless of the specific method of precoder determination by the base station 34, the purpose of the precoder is to match the transmitted signal to the channel as well as possible, resulting in a better conditioned signal at the receiver than without precoding.

It is observed here that the mismatch between the true and predicted channels, as reflected in Δ in equation (10), may affect the ability of the precoder to condition the signal input thereto. This is easy to see with the zero-forcing precoder in equation (13), which transforms the true channel H[t] into the effective channel (given in equation (12)):

$$H[t]\tilde{H}^{-1}[t] = (\tilde{H}[t] + \Delta)\tilde{H}^{-1}[t] \quad (17)$$
$$= I + \Delta\tilde{H}^{-1}[t]$$

where I is the identity matrix. In equation (17), the term $\Delta\tilde{H}^{-1}[t]$ reflects the prediction error. In the absence of such prediction error, the effective channel (in equation (17)) becomes the ideal channel represented by the identity matrix I, which means that channel is perfectly balanced and orthogonal. Intuitively, one can see that a small Δ leads to a small $\Delta\tilde{H}^{-1}[t]$, and an effective channel that is closer to ideal.

In case of the eigen-beamformer in equation (14), the relationship in equation (15) can be used to write the net channel matrix in equation (16) as:

$$H_{net}=\Lambda^2+2Re\{U^h\Delta^h\tilde{H}U\}+U^h\Delta^h\Delta U \quad (18)$$

where Re{x} represents the real part of the complex number "x." It is seen from equation (18) that a small Δ makes the last two terms in the equation small, thereby making the net channel matrix closer to the diagonal matrix $\Lambda^2$.

After determining the precoder as discussed hereinbefore, it is now assumed that the base station 34 applies transmit beamforming (or precoding) to the first and second transmissions (i.e., to symbols transmitted at times 1 and 2) to the terminals 28-29. Let $h_{x,j}^{eff}[t]$ be the effective channel response (including the precoder) from base station's transmit antenna j to terminal x at time t. It is observed here that this effective channel response is antenna-specific and represents the precoder-based version of the channel response h[t] discussed hereinbefore. Thus, similar to the channel's matrix representation in equation (9), the matrix for the effective channel (in equation (12)) may be given by:

$$H_{eff}[t] = \begin{bmatrix} h_{A,1}^{eff}[t] & h_{A,2}^{eff}[t] \\ h_{B,1}^{eff}[t] & h_{B,2}^{eff}[t] \end{bmatrix} \quad (19)$$

It is noted here that despite signal-shaping by the base station 34 using a precoder designed by exploiting partially-stale CSI's from the terminals 28-29, the expressions of equations (1)-(8) still hold in the system 25 of FIG. 2, except that each of the channel response $h_{x,j}[t]$ in these equations are now replaced with the effective channel response $h_{x,j}^{eff}[t]$. Thus, for example, with transmit beamforming (or precoding) applied to the first and second transmissions (i.e., to symbols transmitted at times 1 and 2 to the terminals 28-29 as mentioned above), the combined symbol $w_{AB}$ may become:

$$w_{AB}=h_{A,1}^{eff}[2]u_B+h_{A,2}^{eff}[2]v_B+h_{B,1}^{eff}[1]u_A+h_{B,2}^{eff}[1]v_A \quad (20)$$

With the knowledge of the precoder matrices and channel responses $h_{x,j}[t]$ at times 1 and 2 (whose estimates may be supplied by terminals 28-29 via respective CSI feedbacks as discussed hereinbefore), the transmitter (e.g., the base station 34) may obtain the effective channel responses $h_{x,j}^{eff}[t]$ and may also know how to formulate $w_{AB}$ in equation (20) for the third transmission (i.e., transmission at time 3).

As mentioned earlier with reference to discussion related to equation (17), if the channel prediction is perfect and zero-forcing beamforming is used, $H_{eff}[t]=I$, which translates to $h_{A,1}^{eff}[t]=h_{B,2}^{eff}[t]=1$ and $h_{A,2}^{eff}[t]=h_{B,1}^{eff}[t]=0$ in equation (19).

After the first two transmissions with signal-shaping using the precoder, the base station 34 may have many options for formulating the third transmission (i.e., transmission of the combined symbol $w_{AB}$ at time 3). In one embodiment, the third transmission may also be applied with a precoder. However, in this case, $w_{AB}$ may need to be transmitted from both transmit antennas 36-37 to ensure that $w_{AB}$ is received by both terminals 28-29. The received signals at terminals A and B (i.e., terminals 28-29) are captured by the expression below.

$$\begin{bmatrix} y_A[3] \\ y_B[3] \end{bmatrix} = \begin{bmatrix} h_{A,1}^{eff}[t] & h_{A,2}^{eff}[t] \\ h_{B,1}^{eff}[t] & h_{B,2}^{eff}[t] \end{bmatrix} \begin{bmatrix} w_{AB} \\ w_{AB} \end{bmatrix} + \begin{bmatrix} z_A[3] \\ z_B[3] \end{bmatrix} \quad (21)$$

As discussed above, in case of perfect zero-forcing beamforming, $H_{eff}[t]=I$, and thus equation (21) becomes:

$$\begin{bmatrix} y_A[3] \\ y_B[3] \end{bmatrix} = \begin{bmatrix} w_{AB} \\ w_{AB} \end{bmatrix} + \begin{bmatrix} z_A[3] \\ z_B[3] \end{bmatrix} \quad (22)$$

In general, in case of a precoder-applied transmission of the combined symbol from both base station antennas, the received signal at terminal A at time 3 has slightly different form than that given in equation (6). The received signal at terminal A is given by:

$$y_A[3]=(h_{A,1}^{eff}[3]+h_{A,1}^{eff}[3])w_{AB}+z_A[3] \quad (23)$$

In this case, the virtual second antenna signal for terminal A (i.e., terminal 28) may be given by:

$$y_A'[3] = y_A[3] - (h_{A,1}^{eff}[3] + h_{A,2}^{eff}[3])y_A[2] \quad (24)$$

-continued $$= (h_{A,1}^{eff}[3] + h_{A,2}^{eff}[3])h_{B,1}[1]u_A +$$
$$(h_{A,1}^{eff}[3] + h_{A,2}^{eff}[3])h_{B,2}[1]v_A + z_A[3] -$$
$$(h_{A,1}^{eff}[3] + h_{A,2}^{eff}[3])z_A[2]$$

Equations similar to equations (23) and (24) may be obtained for terminal B as well.

In another embodiment, the base station 34 may apply transmit beamforming (i.e., precoding) to the first and second transmissions (as discussed earlier with reference to equations (19)-(20)) only, but not to the third transmission. In this case, $w_{AB}$ may be transmitted from the first transmit antenna 36 only, or from the second transmit antenna 37 only, or from both the first and the second transmit antennas.

In one embodiment, the base station 34 may optimize the precoder determination (or selection) using various approaches. For example, in one approach, precoder selection may be optimized individually for each transmission (e.g., for transmission of symbols $u_A$ and $v_A$ at time 1, for transmission of symbols $u_B$ and $v_B$ at time 2, and for transmission of symbol $w_{AB}$ at time 3). In this case, P[t] is a function of $\tilde{H}[t]$, i.e., P[t]=f($\tilde{H}[t]$), and is determined separately for each t=1, 2, 3. This approach includes the zero-forcing and eigen-beamformer methods discussed earlier. In another approach, precoders for base station's transmissions at times 1, 2, and 3 (i.e., P[t], t=1, 2, 3) may be first jointly optimized (as discussed below) based on the channel feedbacks (CSI's) available. The channel feedbacks (as discussed before with reference to discussion of predicted channel and equation (10)) may be represented by time-wise consecutive estimates of earlier channels given by $\hat{H}[0], \hat{H}[-1], \ldots, \hat{H}[n-1]$ (assuming negligible channel delay "D"), where "n" is a predetermined number of old estimates that may be selected as per desired implementation. The base station 34 may then apply each precoder from this jointly optimized set of precoders (i.e., {P(1), P(2), P(3)}) to each corresponding transmission at times 1, 2, and 3 (i.e., precoder P(1) applied to transmission at time 1, precoder P(2) applied to transmission at time 2, etc.). Similarly, such joint optimization may continue prior to each subsequent set of transmissions of symbols (i.e., symbols $u_A$, $v_A$, $u_B$, $v_B$, and $w_{AB}$) from the base station 34. In particular, it may be assumed, without much loss of generality, that the channel matrices $\tilde{H}[1]$, $\tilde{H}[2]$, and $\tilde{H}[3]$ may be first predicted based on $\hat{H}[0], \hat{H}[-1], \ldots, \hat{H}[n-1]$, and then the precoders (which are to be applied to corresponding transmissions at times 1, 2, and 3) may be determined as a function of these predicted channels, i.e., P[t]=$f_t$($\tilde{H}[1], \tilde{H}[2], \tilde{H}[3]$). The following describes an example to show how this can be done. Other alternatives may be similarly devised as well.

In LTE, codebook based precoding is used. With this approach, the precoder P[t] is selected from among a set of precoders P={$P_1, P_2, \ldots, P_L$}, where L is the total number of precoders. Thus, depending on which precoder is used, there may be L possible matrices of $H_{eff}[t]$ for a predicted channel matrix one $\tilde{H}[t]$—i.e., one $H_{eff}[t]$ for each precoder selected for a given $\tilde{H}[t]$ (because of one-to-one correspondence between $H_{eff}[t]$ and a precoder). Assuming that the selected precoder is applied in all transmissions for terminal A (i.e., transmissions from equations (1) and (20)), the equivalent 2×2 MIMO received signal model for terminal A (i.e., terminal 28 in FIG. 2) may be given by:

$$\begin{bmatrix} y_A[1] \\ y_A[3] \end{bmatrix} = \tag{25}$$

$$\begin{bmatrix} h_{A,1}^{eff}[1] & h_{A,2}^{eff}[1] \\ (h_{A,1}^{eff}[3] + h_{A,2}^{eff}[3])h_{B,1}^{eff}[1] & (h_{A,1}^{eff}[3] + h_{A,2}^{eff}[3])h_{B,2}^{eff}[1] \end{bmatrix} \begin{bmatrix} u_A \\ v_A \end{bmatrix} +$$

$$\begin{bmatrix} z_A[1] \\ z_A[3] - (h_{A,1}^{eff}[3] + h_{A,2}^{eff}[3])z_A[2] \end{bmatrix}$$

The equivalent 2×2 channel response for terminal A may be thus given by:

$$H_A^{2\times 2} = \begin{bmatrix} h_{A,1}^{eff}[1] & h_{A,2}^{eff}[1] \\ (h_{A,1}^{eff}[3] + h_{A,2}^{eff}[3])h_{B,1}^{eff}[1] & (h_{A,1}^{eff}[3] + h_{A,2}^{eff}[3])h_{B,2}^{eff}[1] \end{bmatrix} \tag{26}$$

and the equivalent 2×2 impairment vector for terminal A may be given by:

$$z_A^{2\times 2} = \begin{bmatrix} z_A[1] \\ z_A[3] - (h_{A,1}^{eff}[3] + h_{A,2}^{eff}[3])z_A[2] \end{bmatrix} \tag{27}$$

Similarly, for terminal B (i.e., terminal 29 in FIG. 2):

$$H_B^{2\times 2} = \begin{bmatrix} h_{B,1}^{eff}[2] & h_{B,2}^{eff}[2] \\ (h_{B,1}^{eff}[3] + h_{B,2}^{eff}[3])h_{A,1}^{eff}[2] & (h_{B,1}^{eff}[3] + h_{B,2}^{eff}[3])h_{A,2}^{eff}[2] \end{bmatrix} \tag{28}$$

$$z_B^{2\times 2} = \begin{bmatrix} z_B[2] \\ z_B[3] - (h_{B,1}^{eff}[3] + h_{B,2}^{eff}[3])z_B[1] \end{bmatrix} \tag{29}$$

For each equivalent 2×2 channel $H_x^{2\times 2}$, the channel capacity can be calculated based on $H_x^{2\times 2}$, and $R_x^{2\times 2}$=E[$z_x^{2\times 2}$ $(z_x^{2\times 2})^H$], where "x" can be A or B (to represent terminal A or terminal B, as applicable). Here E[ . . . ] refers to the expected value operator. In theory, the expected value is the average over the probability distribution of the quantity in brackets. In practice, it can be approximated by a time average. For a vector y, the expected value E[yy$^H$] is identified as the correlation matrix. It indicates how correlated the entries of vector y are. For instance, if the entries are completely uncorrelated, then the off-diagonal elements of the matrix are all zero. If the entries are highly correlated, then the off-diagonal elements are large. The individual channel capacity (which may be measured in, for example, symbols/transmission, bits/symbol, etc.) can be calculated as given below:

$$C(X) = \log det(I + (R_x^{2\times 2})^{-1/2} H_x^{2\times 2} (R_x^{2\times 2})^{-1/2}) \tag{30}$$

The total channel capacity may be thus given by the summation of individual terminal-specific channel capacities:

$$C = C(A) + C(B) \tag{31}$$

Since there may be L possible matrices of $H_{eff}[t]$ at each time, over three time intervals (t=1, 2, 3), there are $L^3$ possible combinations of the triplet ($H_{eff}[1]$, $H_{eff}[2]$, $H_{eff}[3]$). In one embodiment, the base station 34 may evaluate the sum capacity (in equation (31)) for each of these $L^3$ combinations, and the effective channel combination (and the corresponding combination of precoders {P(1), P(2), P(3)} due to one-to-one correspondence between a precoder and $H_{eff}[t]$ as mentioned earlier) that results in the highest sum capacity can be chosen after all $L^3$ possible combinations are evaluated. Thus, instead of individual determination, each precoder for respective base station transmission (at times 1, 2, and 3) may be jointly determined along with the other two precoders prior to the first transmission (i.e., transmission at time 1). The base station 34 may then commence the transmission at times 1, 2, and 3, and apply respective precoder (P(1), P(2), or P(3)) to each transmission.

In one embodiment, the base station 34 may determine that the prediction error (e.g., Δ in equation (10) above) is large (i.e., beyond a predetermined threshold of acceptable error). Such a situation may arise, e.g., due to an increase in relative speed between the base station 34 and the terminals 28, 29. In that case, precoding may become ineffective, and the precoding-related steps (e.g., steps 48, 50, 52, 54, and 56 in the flowchart 45 in FIG. 3) may be skipped. The base station 34 may instruct the terminals 28-29 (e.g., via appropriate control signals such as, for example, the earlier-mentioned PDCCH signal in an LTE network) to reduce the feedback so that only the listening terminal sends its CSI (instead of both of the terminals as discussed earlier with reference to the flowchart 45 in FIG. 3), which may result in a scheme that is similar to the scheme discussed in the "Background" section hereinbefore with reference to Paper-1.

Figure 5:
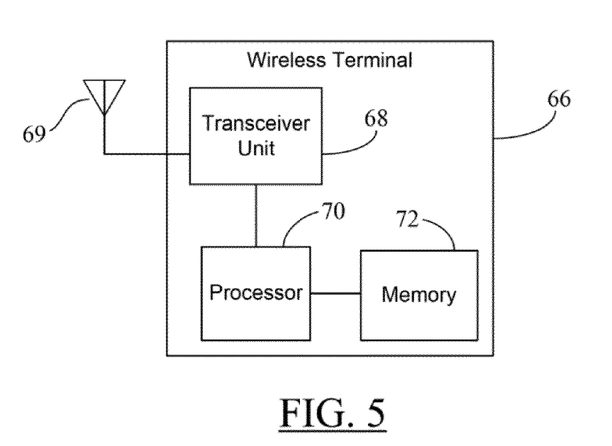
FIG. 5 is a block diagram of an exemplary wireless terminal according to one embodiment of the present invention.

FIG. 5 is a block diagram of an exemplary wireless terminal 66 according to one embodiment of the present invention. The terminal 66 may represent either of the terminals 28, 29 in FIG. 3. The terminal 66 may include a transceiver 68, an antenna 69, a processor 70, and a memory 72. In particular embodiments, some or all of the functionalities described above (e.g., reception of transmissions (whether precoded or not) from the base station 34 using the antenna 69 and transceiver 68; storage of the received transmission in the memory 72 prior to processing the transmission using the processor 70 to recover symbols sent therethrough; transmission of CSI reports to the base station 34 using transceiver 68 and antenna 69; etc.) as being provided by wireless terminals or other forms of mobile communication devices may be provided using the processor 70 executing instructions stored on a computer-readable medium, such as the memory 72 shown in FIG. 5. Alternative embodiments of the terminal 66 may include additional components beyond those shown in FIG. 5 that may be responsible for enabling the terminal's 66 communication with the base station 34 in the network 32 and for providing certain aspects of the terminal's functionality, including any of the functionality described above and/or any functionality necessary to support the solution described above.

Figure 6:
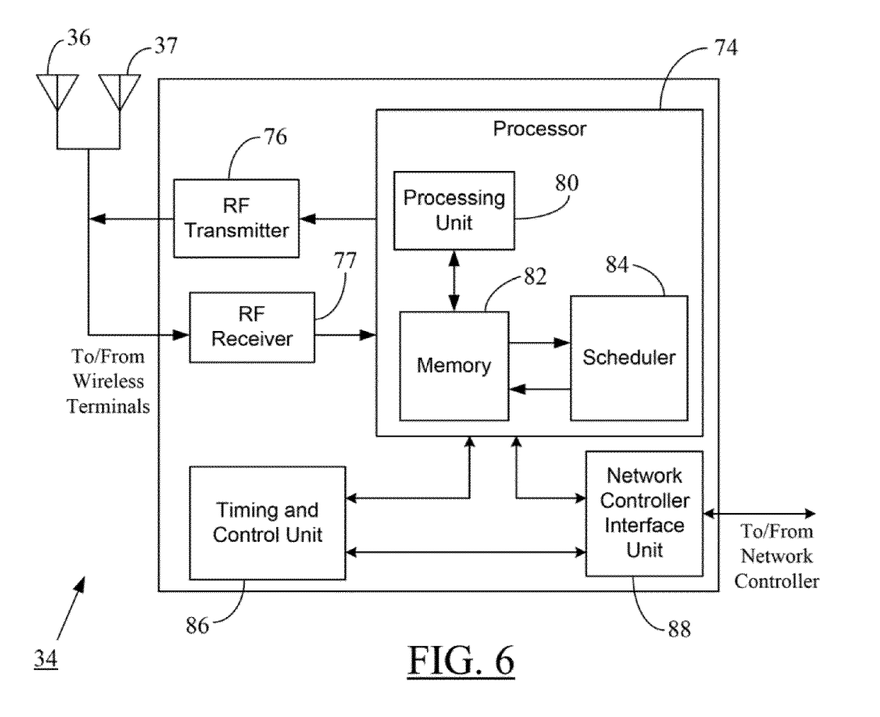
FIG. 6 is a block diagram of an exemplary communication node or base station according to one embodiment of the present invention.

FIG. 6 is a block diagram of an exemplary communication node or base station 34 according to one embodiment of the present invention. The base station 34 may include a processor 74 to provide radio interface with the wireless terminals 28-29 (in the carrier network 32) via base station's Radio Frequency (RF) transmitter 76 and RF receiver 77 units, which are coupled to the two antennas 36-37. The processor 74 may be configured (in hardware and/or software) to transmit to the terminals 28-29 precoded symbols. In one embodiment, the processor 74 may determine the appropriate precoder using transmissions (i.e., partially-stale CSI feedbacks) received from the terminals 28-29 via the receiver 77, whereas base station's transmissions to the terminals 28-29 may be carried out via the transmitter 76 and antennas 36-37. The processor 74 may include a processing unit 80 in communication with a memory 82 to process and store relevant information. A scheduler (e.g., the scheduler 84 in FIG. 6) in the base station 34 may provide the uplink transmission scheduling decisions for the terminals 28-29 based on a number of factors such as, for example, QoS (Quality of Service) parameters, terminal's buffer/memory status, uplink CSI report received from the terminal, terminal's processing capabilities, etc. In one embodiment, the scheduler 84 may have the same data structure as a typical scheduler in an eNB in an LTE system.

The processor 74 may also provide additional baseband signal processing (e.g., terminal registration, channel signal information transmission, radio resource management, etc.) as required. The processing unit 80 may include, by way of example, a general 12-9051 purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above as being provided by a base station, a base station controller, a node B, an evolved node B, an HeNB, a home base station, a femtocell base station, and/or any other type of communication node may be provided by the processing unit 80 executing instructions stored on a computer-readable data storage medium, such as the memory 82 shown in FIG. 6.

The base station 34 may further include a timing and control unit 86 and a network controller interface unit 88 as illustrated in FIG. 6. The control unit 86 may monitor operations of the processor 74 and the interface unit 88, and may provide appropriate timing and control signals to these units. The interface unit 88 may provide a bi-directional interface for the base station 34 to communicate with the network controller 42 to facilitate administrative, call-management, and external resource-management functions for the base station 34 and the wireless terminals 28-29 operating in the carrier network 32.

Alternative embodiments of the base station 34 may include additional components responsible for providing additional functionality, including any of the functionality identified above and/or any functionality necessary to support the solution described above. Although features and elements are described above in particular combinations, each feature or element can be used alone without the other features and elements or in various combinations with or without other features and elements. The methodology provided herein (related to usage of partially-stale CSI) may be implemented in a computer program, software, or firmware incorporated in a computer-readable storage medium (e.g., the memory 82 in FIG. 6) for execution by a general purpose computer or a processor (e.g., the processing unit 80 in FIG. 6). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

The foregoing describes a system and method in which a base station treats the Channel State Information (CSI) from wireless terminals as only partially-stale, and exploits this partially-stale CSI to predict the current channel from old estimates of the channel. The predicted channel is then used to design a precoder. Thereafter, the base station shapes the transmitted signal with the precoder so as to match it as closely as possible to the current channel. Particular embodiments of the disclosed solutions combine the benefits of the stale feedback scheme with precoding to match the channel. As a result, the signal received at a terminal is better conditioned, thereby providing a greater overall boost in performance of the communication arrangement between the base station and the terminal. The usage of partially-stale CSI can be important for dense networks with a large number of simple terminals having a single antenna, a noisy front end, limited processing capability, and slow feedback. This makes the boost in the terminal's performance afforded by the present invention particularly useful.

It is noted here that the teachings of the present invention related to usage of partially-stale CSI may be applied, with suitable modifications (as may be apparent to one skilled in the art using the present teachings), to a number of different wireless systems or networks, such as, for example, networks/systems using 3G/4G specifications. Some examples of such systems or networks include, but not limited to, Global System for Mobile communications (GSM) networks, LTE networks, LTE-Advanced networks, UTRAN/E-UTRAN networks, Wideband Code Division Multiple Access (WCDMA) systems, WCDMA-based High Speed Packet Access (HSPA) systems, CDMA2000 systems, GSM/Enhanced Data Rate for GSM Evolution (GSM/EDGE) systems, Evolution-Data Optimized (EV-DO) systems, and Worldwide Interoperability for Microwave Access (WiMAX) systems.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of providing wireless transmissions between a processor-controlled base station and a plurality of terminals via a communication channel established in a wireless network, wherein the base station includes a plurality of transmit antennas, the method comprising steps of:
   using the processor, receiving respective terminal-specific Channel State Information (CSI) feedback from each of a first terminal and a second terminal in the plurality of terminals, wherein each terminal-specific CSI feedback corresponds to all antenna element-specific transmissions from the base station to either of the first and the second terminals, wherein the antenna element-specific transmissions temporally precede the terminal-specific CSI feedback;
   using the processor, determining a predicted communication channel based on a pre-determined number of time-wise consecutive channel estimates, wherein the predicted communication channel represents a prediction of the communication channel based on partially stale CSI feedback, wherein the pre-determined number of time-wise consecutive channel estimates are generated by repeating the reception of the CSI feedback from the first and the second terminals and determination of channel estimate for a pre-determined number of temporally consecutive base station transmissions, wherein the pre-determined number of time-wise consecutive channel estimates represents a pre-determined number of time-wise correlated CSI feedbacks;
   using the processor, shaping at least one terminal-specific transmission intended for the corresponding one or both of the first and the second terminals based on the predicted communication channel; and
   using the processor, providing a common transmission intended for both of the first and the second terminals, wherein the providing step includes:
      using the predicted communication channel to determine a precoder matrix;
      determining effective antenna element-specific channel parameters based on past precoder matrices and CSI feedback from each of the first and the second terminals; and
      formulating a combined symbol based on the effective antenna element-specific channel parameters and information symbols included in an earlier terminal-specific transmission to at least one of the first and the second terminals.

2. The method of claim 1, wherein the communication channel is a Radio Frequency (RF) channel.

3. The method of claim 1, wherein the step of determining the predicted communication channel includes:
   using the processor, determining a channel estimate of the communication channel based on the respective terminal-specific CSI feedback received from each of the first and the second terminals; and
   using the processor, determining the predicted communication channel based on the pre-determined number of time-wise consecutive channel estimates.

4. The method of claim 3, wherein the plurality of transmit antennas includes a first antenna and a second antenna, and wherein receiving the respective terminal-specific CSI feedback includes:
   using the first transmit antenna, at a first time, transmitting over the communication channel a first symbol intended for the first terminal;
   using the second transmit antenna, at the first time, transmitting over the communication channel a second symbol intended for the first terminal;
   receiving the CSI feedback from the first terminal including estimates of a first pair of antenna element-specific parameters related to a status of the communication channel at the first time; and
   receiving the CSI feedback from the second terminal including estimates of a second pair of antenna element-specific parameters related to the status of the communication channel at the first time.

5. The method of claim 4, wherein the step of determining the channel estimate includes:
   determining the channel estimate associated with the first time using the estimates of the first and the second pairs of antenna element-specific parameters.

6. The method of claim 5, wherein the step of repeating the reception of the terminal-specific CSI feedback and determination of the channel estimate includes:
   using the first antenna, at a second time, transmitting over the communication channel a third symbol intended for the second terminal;
   using the second antenna, at the second time, transmitting over the communication channel a fourth symbol intended for the second terminal;
   receiving the CSI feedback from the second terminal including estimates of the second pair of antenna element-specific parameters related to a status of the communication channel at the second time;
   receiving the CSI feedback from the first terminal including estimates of the first pair of antenna element-specific parameters related to the status of the communication channel at the second time; and
   determining the channel estimate associated with the second time using the estimates of the first and the second pairs of antenna element-specific parameters received in response to the transmissions of the third and the fourth symbols at the second time.

7. The method of claim 3, wherein the step of determining the predicted communication channel includes:
determining the predicted communication channel by using a moving average of the pre-determined number of time-wise consecutive channel estimates.

8. The method of claim 3, wherein the pre-determined number of temporally consecutive base station transmissions includes more than one transmissions, and wherein the pre-determined number of time-wise consecutive channel estimates includes more than one estimates.

9. The method of claim 1, wherein the step of shaping at least one transmission includes at least one of the following:
applying the precoder to at least one terminal-specific transmission intended for the first terminal prior to sending the transmission to the first terminal, and
applying the precoder to at least one terminal-specific transmission intended for the second terminal prior to sending the transmission to the second terminal.

10. The method of claim 9, wherein the precoder is one of the following: a zero-forcing precoder based on an inverse of the predicted communication channel; and an eigen-beamformer based on a unitary matrix.

11. The method of claim 9, wherein determining the precoder includes one of the following:
separately determining each of the following:
a first precoder for a first terminal-specific transmission intended for the first terminal,
a second precoder for a second terminal-specific transmission intended for the second terminal, and
a third precoder for a combined symbol to be transmitted by the processor as the common transmission to both of the first and the second terminals, wherein the combined symbol includes a channel-status related information associated with the first and the second terminal-specific transmissions along with information related to the contents of the first and the second terminal-specific transmissions; and
jointly selecting the first, the second, and the third precoders prior to applying any of the first, the second, and the third precoders to a corresponding one or more terminal-specific transmissions.

12. The method of claim 11, wherein jointly selecting the first, the second, and the third precoders includes:
evaluating a channel capacity using a plurality of sets of pre-determined precoders, wherein the channel capacity is based on individual channel capacities modeled for the first and the second terminals; and
selecting that one of the plurality of sets of pre-determined precoders which results in a highest value for the channel capacity under evaluation, wherein the selected set of pre-determined precoders contains the first, the second, and the third precoders.

13. The method of claim 1, further comprising the steps of:
using the processor, monitoring a prediction error associated with determination of the predicted communication channel; and
using the processor, discontinuing the shaping of the at least one terminal-specific transmission when the prediction error is more than a predetermined threshold of error.

14. A method of providing wireless transmissions between a processor-controlled base station and a plurality of terminals via a communication channel established in a wireless network, wherein the base station includes a plurality of transmit antennas, the method comprising steps of:
using the processor, receiving respective terminal-specific Channel State Information (CSI) feedback from each of a first terminal and a second terminal in the plurality of terminals, wherein each terminal-specific CSI feedback corresponds to all antenna element-specific transmissions from the base station to either of the first and the second terminals, wherein the antenna element-specific transmissions temporally precede the terminal-specific CSI feedback;
using the processor, determining a predicted communication channel based on a pre-determined number of time-wise consecutive channel estimates, wherein the predicted communication channel represents a prediction of the communication channel based on partially stale CSI feedback, wherein the pre-determined number of time-wise consecutive channel estimates are generated by repeating the reception of the CSI feedback from the first and the second terminals and determination of channel estimate for a pre-determined number of temporally consecutive base station transmissions, wherein the pre-determined number of time-wise consecutive channel estimates represents a pre-determined number of time-wise correlated CSI feedbacks;
using the processor, shaping at least one terminal-specific transmission intended for the corresponding one or both of the first and the second terminals based on the predicted communication channel, wherein the step of shaping at least one transmission includes:
determining a precoder based on the predicted communication channel; and
performing at least one of the following:
applying the precoder to at least one terminal-specific transmission intended for the first terminal prior to sending the transmission to the first terminal, and
applying the precoder to at least one terminal-specific transmission intended for the second terminal prior to sending the transmission to the second terminal:
wherein the plurality of transmit antennas includes a first antenna and a second antenna, and wherein the method further comprises performing the following using the processor:
applying the precoder to a first symbol and a second symbol to be transmitted to the first terminal;
using the first transmit antenna, at a first time, transmitting over the communication channel the precoder-applied first symbol intended for the first terminal;
using the second transmit antenna, at the first time, transmitting over the communication channel the precoder-applied second symbol intended for the first terminal;
receiving the CSI feedback from the second terminal including estimates of a first pair of effective antenna element-specific parameters related to a status of the communication channel at the first time;
applying the precoder to a third symbol and a fourth symbol to be transmitted to the second terminal;
using the first transmit antenna, at a second time, transmitting over the communication channel the precoder-applied third symbol intended for the second terminal;
using the second transmit antenna, at the second time, transmitting over the communication channel the precoder-applied fourth symbol intended for the second terminal;
receiving the CSI feedback from the first terminal including estimates of a second pair of effective antenna element-specific parameters related to the status of the communication channel at the second time; and
using the processor, generating a combined symbol for a common transmission intended for both of the first and the second terminals and containing a summation of a plurality of products, wherein each product is a multiplication of an effective antenna element-specific parameter from the first and the second pairs of effective antenna element-specific parameters with a corresponding one of the first, second, third, and fourth symbols.

15. The method of claim 14, further comprising one of the following steps:
using the processor, performing the following:
applying the precoder to the combined symbol, and
using the first and the second antennas, transmitting the precoder-applied combined symbol over the communication channel at a third time; and
using the processor, performing one of the following:
using the first antenna, transmitting the combined symbol over the communication channel at the third time without applying the precoder to the combined symbol,
using the second antenna, transmitting the combined symbol over the communication channel at the third time without applying the precoder to the combined symbol, and
using the first and the second antennas, transmitting the combined symbol over the communication channel at the third time without applying the precoder to the combined symbol.

16. A method of providing wireless transmissions from a processor-controlled base station that is in wireless communication with two or more terminals via a communication channel established in a wireless network, wherein the base station includes two or more transmit antennas and each of the two or more terminals has at least one receive antenna, and wherein the method comprises the steps of:
using the processor, receiving respective terminal-specific Channel State Information (CSI) feedback from each of the two or more terminals, wherein each terminal-specific CSI feedback corresponds to all antenna element-specific transmissions from the base station to any of the two or more terminals, wherein the antenna element-specific transmissions temporally precede the terminal-specific CSI feedback;
using the processor, determining a channel estimate of the communication channel based on the respective CSI feedback received from each of the two or more terminals;
using the processor, repeating the reception of the CSI feedback from the two or more terminals and determination of the channel estimate for a pre-determined number of temporally consecutive base station transmissions, thereby generating a pre-determined number of time-wise consecutive channel estimates;
using the processor, determining a predicted communication channel based on the pre-determined number of time-wise consecutive channel estimates, wherein the predicted communication channel represents a prediction of the communication channel based on partially stale CSI feedback, wherein the predetermined number of time-wise consecutive channel estimates represent a predetermined number of time-wise correlated CSI feedback;
using the processor, shaping at least one terminal-specific transmission intended for the corresponding one or more of the two or more terminals based on the predicted communication channel; and
using the processor, providing a common transmission intended for all of the two or more terminals, wherein the providing step includes:
using the predicted communication channel to determine a precoder matrix;
determining effective antenna-specific channel parameters based on past precoder matrices and CSI feedback from each of the first and the second terminals; and
formulating a combined symbol based on effective antenna element-specific channel parameters and information symbols included in an earlier terminal-specific transmission to at least one of the two or more terminals.

17. A base station that is in wireless communication with a first terminal and a second terminal via a communication channel in a wireless network, wherein the base station has a plurality of transmit antennas, and wherein the base station comprises a processor and is configured to perform the following:
receive a respective terminal-specific Channel State Information (CSI) feedback from each of the first and the second terminals, wherein each terminal-specific CSI feedback corresponds to all antenna element-specific transmissions from the base station to either of the first and the second terminals, wherein the antenna element-specific transmissions temporally precede the terminal-specific CSI feedback;
using the processor to determine a predicted communication channel based on a pre-determined number of time-wise consecutive channel estimates, wherein the predicted communication channel represents a prediction of the communication channel based on partially stale CSI feedback, wherein the pre-determined number of time-wise consecutive channel estimates are generated by repeating the reception of the CSI feedback from the first and the second terminals and determination of channel estimate for a pre-determined number of temporally consecutive base station transmissions, wherein the pre-determined number of time-wise consecutive channel estimates represents a pre-determined number of time-wise correlated CSI feedbacks;
shape at least one terminal-specific transmission intended for the corresponding one or both of the first and the second terminals based on the predicted communication channel; and
provide a common transmission intended for both of the first and the second terminals, wherein the providing step includes:
using the predicted communication channel to determine a precoder matrix;
determining effective antenna element-specific channel parameters based on past precoder matrices and CSI feedback from each of the first and the second terminals; and
formulating a combined symbol based on the effective antenna element-specific channel parameters and information symbols included in an earlier terminal-specific transmission to at least one of the first and the second terminals.

18. The base station of claim 17, the processor further configured to perform the following as part of shaping the at least one terminal-specific transmission:
apply the precoder to at least one terminal-specific transmission intended for the first terminal prior to sending the transmission to the first terminal, and
apply the precoder to at least one terminal-specific transmission intended for the second terminal prior to sending the transmission to the second terminal.

19. A base station that is in wireless communication with a first terminal and a second terminal via a communication channel in a wireless network, wherein the base station comprises a plurality of transmit antennas and a processor, and wherein the base station is configured to perform the following:
- receive a respective terminal-specific Channel State Information (CSI) feedback from each of the first and the second terminals, wherein each terminal-specific CSI feedback corresponds to all antenna element-specific transmissions from the base station to either of the first and the second terminals, wherein the antenna element-specific transmissions temporally precede the terminal-specific CSI feedback;
- using the processor to determine a predicted communication channel based on a pre-determined number of time-wise consecutive channel estimates, wherein the predicted communication channel represents a prediction of the communication channel based on partially stale CSI feedback, wherein the pre-determined number of time-wise consecutive channel estimates are generated by repeating the reception of the CSI feedback from the first and the second terminals and determination of channel estimate for a pre-determined number of temporally consecutive base station transmissions, wherein the pre-determined number of time-wise consecutive channel estimates represents a pre-determined number of time-wise correlated CSI feedbacks;
- shape at least one terminal-specific transmission intended for the corresponding one or both of the first and the second terminals based on the predicted communication channel, wherein the processor is configured to:
- determine a precoder based on the predicted communication channel; and
- perform at least one of the following:
- apply the precoder to at least one terminal-specific transmission intended for the first terminal prior to sending the transmission to the first terminal, and
- apply the precoder to at least one terminal-specific transmission intended for the second terminal prior to sending the transmission to the second terminal;
- wherein the plurality of transmit antennas includes a first antenna and a second antenna, and wherein the base station is further configured to perform the following:
- apply the precoder to a first symbol and a second symbol to be transmitted to the first terminal;
- using the first transmit antenna, at a first time, transmit over the communication channel the precoder-applied first symbol intended for the first terminal;
- using the second transmit antenna, at the first time, transmit over the communication channel the precoder-applied second symbol intended for the first terminal;
- receive the CSI feedback from the second terminal including estimates of a first pair of effective antenna element-specific parameters related to a status of the communication channel at the first time;
- apply the precoder to a third symbol and a fourth symbol to be transmitted to the second terminal;
- using the first transmit antenna, at a second time, transmit over the communication channel the precoder-applied third symbol intended for the second terminal;
- using the second transmit antenna, at the second time, transmit over the communication channel the precoder-applied fourth symbol intended for the second terminal;
- receive the CSI feedback from the first terminal including estimates of a second pair of effective antenna element-specific parameters related to the status of the communication channel at the second time;
- generate a combined symbol for a common transmission intended for both of the first and the second terminals and containing a summation of a plurality of products, wherein each product is a multiplication of an effective antenna element-specific parameter from the first and the second pairs of effective antenna element-specific parameters with a corresponding one of the first, second, third, and fourth symbols; and
- using at least one of the first and the second antennas, transmit the combined symbol over the communication channel at a third time.

20. A system comprising:
- a communication node that is in wireless communication with a plurality of wireless terminals via a communication channel established in a wireless network, wherein the communication node has a plurality of transmit antennas and a processor, and is configured to perform the following:
- receive a respective terminal-specific Channel State Information (CSI) feedback from each of the plurality of wireless terminals,
- using the processor to determine a channel estimate of the communication channel based on the respective CSI feedback received from each of the plurality of wireless terminals,
- repeat the reception of the CSI feedback from the plurality of wireless terminals and determination of the channel estimate for a pre-determined number of temporally consecutive transmissions from the communication node, thereby generating a pre-determined number of time-wise consecutive channel estimates, wherein the predetermined number of time-wise consecutive channel estimates represent a predetermined number of time-wise correlated CSI feedback;
- determine a predicted communication channel based on the predetermined number of time-wise consecutive channel estimates, wherein the predicted communication channel represents a prediction of the communication channel based on partially stale CSI feedback;
- shape at least one terminal-specific transmission intended for the corresponding one or both of the plurality of wireless terminals based on the predicted communication channel, and
- provide a common transmission intended for plurality of wireless terminals and related to a combination of, wherein the communication node is configured to:
- utilize the predicted communication channel to determine a precoder matrix;
- using the processor to determine effective antenna-specific channel parameters based on past precoder matrices and CSI feedback from each of the plurality of wireless terminals; and
- formulate a combined symbol based on the effective antenna element-specific channel parameters and information symbols included in an earlier terminal-specific transmission to at least one of the plurality of wireless terminals; and
- the plurality of wireless terminals configured to provide the respective terminal-specific CSI feedbacks to the communication node, wherein each terminal-specific CSI feedback corresponds to all antenna element-specific transmissions from the communication node to one of the plurality of wireless terminals, wherein the antenna element-specific transmissions temporally precede the terminal-specific CSI feedback.

21. The system of claim 20, wherein the communication node is further configured to shape the at least one terminal-specific transmission using the precoder determined from the predicted communication channel, and wherein each of the plurality of wireless terminals is configured to recover one or more symbols from at least one precoder-applied transmission received from the communication node.

\* \* \* \* \*